(12) United States Patent
Hiramatsu

(10) Patent No.: US 6,980,833 B1
(45) Date of Patent: Dec. 27, 2005

(54) RADIO COMMUNICATION DEVICE AND TRANSMISSION ANTENNA SWITCHING METHOD

(75) Inventor: Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/600,329

(22) PCT Filed: Nov. 16, 1999

(86) PCT No.: PCT/JP99/06378

§ 371 (c)(1),
(2), (4) Date: Jun. 14, 2000

(87) PCT Pub. No.: WO00/30276

PCT Pub. Date: May 25, 2000

(30) Foreign Application Priority Data

Nov. 18, 1998 (JP) ............................................ 10-328293

(51) Int. Cl.[7] ................................................. H04B 1/38
(52) U.S. Cl. ................. 455/562.1; 455/101; 455/277.1; 375/347
(58) Field of Search .......................... 455/277.1, 277.2, 455/275, 101, 272, 63.4, 65, 562.1, 273; 375/347

(56) References Cited

U.S. PATENT DOCUMENTS 5,671,221 A 9/1997 Yang
6,400,780 B1 * 6/2002 Rashid-Farrokhi et al. . 375/347
6,724,828 B1 * 4/2004 Dabak ......................... 375/267

FOREIGN PATENT DOCUMENTS

JP 9219675 8/1997
JP 10117165 5/1998
JP 10163938 6/1998
KR 0137684 12/1996

OTHER PUBLICATIONS

English translation of Korean Office Action.
Korean Office Action dated May 29, 2002.
English translation of Korean Office Action.

* cited by examiner

Primary Examiner—Edward F. Urban
Assistant Examiner—Blane J. Jackson
(74) Attorney, Agent, or Firm—Stevens, Davis, Miller & Mosher, LLP (57) ABSTRACT

A determining circuit 213 of a mobile station measures the number of paths of a forward link. In a case where the number of paths is smaller than a threshold value, the determining circuit 213 determines that execution of an operation for changing an antenna is necessary. In the other case, the determining circuit 213 determines that execution of an operation for changing an antenna is unnecessary. A multiplexing circuit 214 multiplexes a control signal, which puts the determination result of determining circuit 213 thereon, into transmission data to be transmitted. In a base station apparatus, the control signal is separated from the received signal, and it is determined whether or not the operation for changing the antenna is executed. This makes it possible to execute the operation for changing transmission antenna only when reception quality is improved by changing transmission antenna, and to suppress execution of the change of transmission antenna to a minimum.

21 Claims, 9 Drawing Sheets

RADIO COMMUNICATION DEVICE AND TRANSMISSION ANTENNA SWITCHING METHOD

1. Technical Field

The present invention relates to a radio communication apparatus in a radio communication system that performs radio transmission using selective diversity, and relates to a transmission antenna changing method.

2. Background Art

In recent years, there has been adopted space diversity in which a plurality of antenna branches (hereinafter simply referred to as "antenna") is provided in a base station apparatus to reserve a plurality of paths. As one of space diversity, there is selective diversity that selects an optimal antenna in accordance with a propagation state. A method, which uses selective diversity at the transmission side, is hereinafter referred to as transmission selective diversity. Transmission selective diversity in a radio communication apparatus of TDD (Time Division Duplex) system has been already disclosed in the document "Transmission Characteristics of Next Generation W-CDMA/TDD system (Report, SSE97-41, RCS97-36 (1997-06) the Institute of Electronics, information and Communication Engineers)" and the like.

This method is one in which correlation values of the respective branches of a reverse link are averaged over one previous slot (0.625 ms) to obtain reception power for a communication channel, and an antenna having higher reception power is selected to carry out transmission for slot (0.625 ms) in a forward link.

Thus, in the case of the radio communication apparatus of TDD system, which uses the same frequency in both reverse and forward links, a transmission antenna can be selected based on reception power of the reverse link.

While, in the case of the radio communication apparatus of FDD (Frequency Division Duplex) system, which uses a different frequency in each of the reverse and forward links, since the transmission antenna cannot be selected based on reception power of the reverse link, and the transmission antenna of a base station is selected based on reception power of one previous slot control signal in a terminal apparatus.

Regarding transmission selective diversity in the conventional radio communication apparatus of FDD system, the following will exemplify the case of CDMA system.

First, the base station apparatus transmits a control signal of spreading code A from antenna A, and a control signal of spreading code B from antenna B. Then, a terminal apparatus measures reception power of spreading code A and that of spreading code B, respectively, and reports spreading code having higher reception power, that is, antenna number to the base station apparatus. The base station apparatus selects an antenna for transmitting data to the terminal apparatus based on the report from the terminal apparatus.

Here, in a communication system such as CDMA, which has high resolution with respect to a delay wave, there is a case in which RAKE combing, which combines received signals each having a different arrival time, is carried out to improve performance of reception. When the number of reception paths is large, the reception characteristic on the receiving side is little improved by the characteristic of RAKE combining even if the transmission antenna is changed on the transmitting side. Moreover, if the transmission antenna is changed, reception power of an interference signal is largely changed in the other terminal apparatus, so that reception quality becomes worse. Therefore, in consideration of the entirety of system, execution of changing the transmission antenna is desirably constrained to a minimum.

However, the transmission selective diversity of the conventional radio communication apparatus of FDD system has a problem in which the change of antenna is executed even when the reception characteristic of the receiving side is little improved, that is, the change of antenna is unnecessary.

DISCLOSURE OF INVENTION

A first object of the present invention is to provide a radio communication apparatus of FDD system, which executes an operation for changing a transmission antenna only when reception quality is improved by changing the transmission antenna, and to provide a transmission antenna changing method.

The above object can be achieved by measuring the number of paths of a link from a delay profile of received signal and determining whether or not the operation for changing the antenna is executed based on the measured number of paths.

BEST MODE FOR CARRYING OUT THE INVENTION

Embodiments of the present invention will be specifically explained with reference to the drawings attached thereto.

Embodiment 1

Embodiment 1 focuses on the point in which diversity effect, which is caused by a change of antenna, is small since path diversity effect, which is caused by RAKE combing, is obtained when the number of reception paths is large. More specifically. Embodiment 1 is a specific form wherein a terminal apparatus measures the number of reception paths from a received signal to determine whether or not a change of antenna is needed based on the measured number of paths, and transmits information, which shows a determination result, to a base station apparatus, and the base station apparatus selects whether or not the change of antenna is executed based on the determination result received the terminal apparatus.

Figure 1:
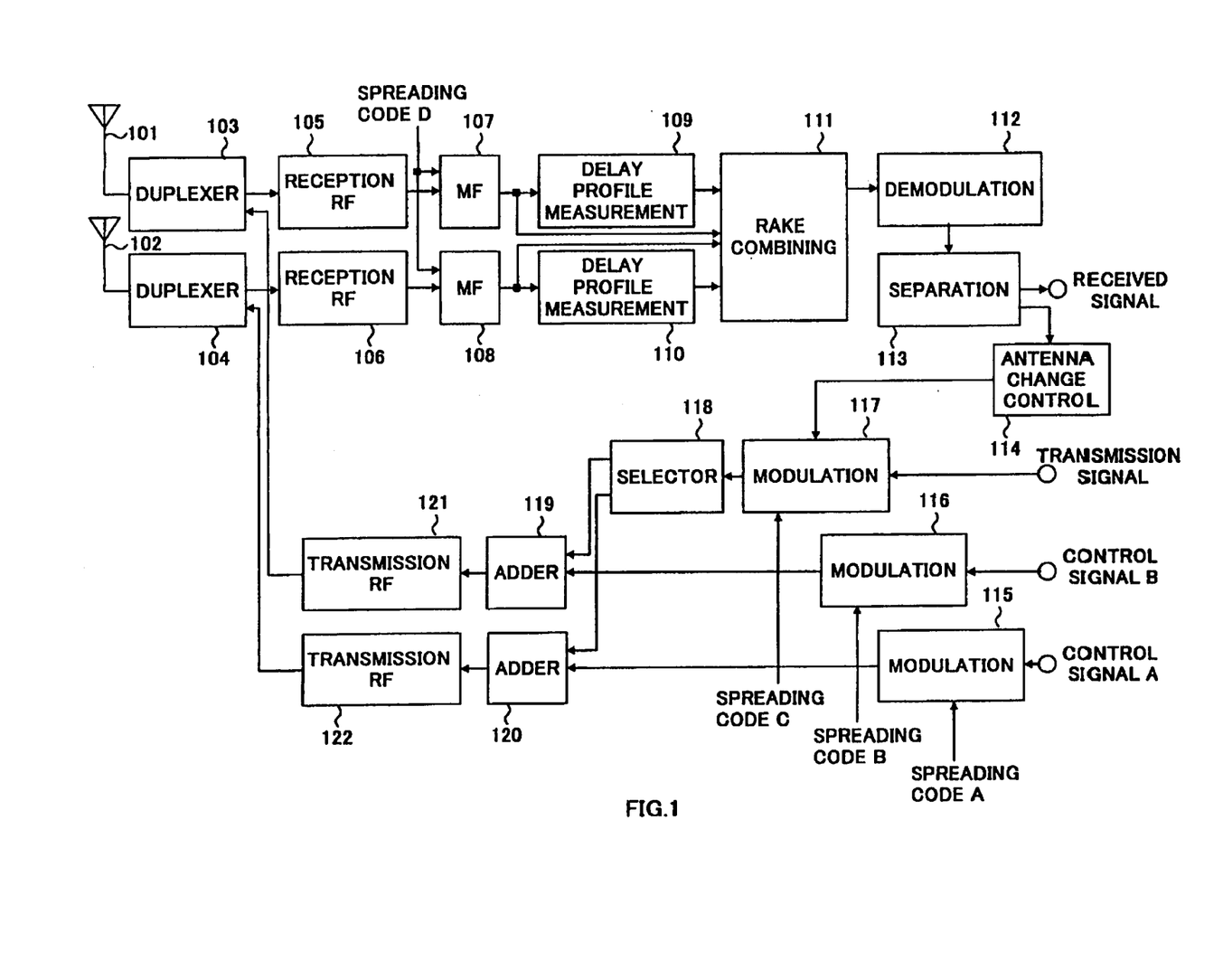
FIG. 1 is a block diagram showing a configuration of a base station apparatus according to Embodiment 1 of the present invention.

FIG. 1 is a block diagram showing the configuration of the base station apparatus according to Embodiment 1 of the present invention.

In the base station apparatus of FIG. 1, an antenna duplexer 103 is used such that the same antenna is employed in both transmission and reception. The antenna duplexer 103 outputs a signal radio received by an antenna 101 to a reception RF section 105, and outputs a transmission signal output from a transmission RF section 121 to the antenna 101. Similarly, an antenna duplexer 104 outputs a signal radio received by an antenna 102 to a reception RF section 106, and outputs a transmission signal output from a transmission RF section 122 to the antenna 102.

The reception RF sections 105 and 106 amplify received signals input from the antenna duplexers 103 and 104, frequency convert the amplified signals to intermediate or baseband frequencies, and output the frequency-converted signals to matched filters 107 and 108, respectively. The matched filters 107 and 108 perform despreading by multiplying the output signals of reception RF sections 105 and 106 by the same spreading code D multiplied by the terminal apparatus, respectively. Then, the matched filters 107 and 108 send the resultant to a delay profile measuring circuits 109, 110, and a RAKE combining circuit 111, respectively.

The delay profile measuring circuits 109 and 110 measure delay profiles of output signals of matched filters 107 and 108, respectively to obtain arrival time of signals of the respective paths and power at each arrival time, and output time information of received paths to the RAKE combining circuit 111, respectively.

The RAKE combining circuit 111 synchronizes time of the respective signals, each having a different arrival time output from the matched filters 107 and 108, based on time information of reception paths output from the delay profile measuring circuits 109 and 110, and combines these signals, and outputs the resultant to a demodulating circuit 112. The demodulating circuit 112 demodulates the output signal of RAKE combining circuit 111, and outputs the demodulated signal to a separating circuit 113.

The separating circuit 113 separates a control signal from the output signal of demodulating circuit 112 to extract reception data, and picks up a change necessary/unnecessary signal, which shows whether or not an operation for changing an antenna is needed, and an antenna selective signal, which shows a transmission antenna number, and outputs the resultant to an antenna change controlling section 114.

The antenna change controlling section 114 reads the change necessary/unnecessary signal from the separating circuit 113. Then, in a case where the operation for changing an antenna is necessary, the antenna change controlling section 114 performs the operation for changing an antenna, that is, the change of a selector 118 to transmit the signal from the antenna, which is shown by the antenna selective signal output from the separating circuit 113.

A modulating circuit 115 provides primary modulation such as PSK and secondary modulation, which multiplies control signal A by spreading code A, to control signal A, and outputs the resultant to an adder 119. A modulating circuit 116 provides primary modulation such as PSK and secondary modulation, which multiplies control signal B by spreading code B, to control signal B, and outputs the resultant to an adder 120. A modulating circuit 117 provides primary modulation such as PSK and secondary modulation, which multiplies transmission data by spreading code A, to transmission data, and outputs the resultant to the selector 118.

The selector 118 outputs the output signal of the modulating circuit 117 to either the adder 119 or the adder 120 by control of the antenna change controlling circuit 114. The adder 119 or 120 multiplexes the input signal, and outputs the multiplexed signal to transmission RF section 121 or 122, respectively.

The transmission RF section 121 provides processing such as quardrature modulation, frequency conversion, amplification, and the like to the output signal of adder 119, and performs radio transmission from the antenna 101 through the antenna duplexer 103. Similarly, the transmission RF section 122 provides processing such as quardrature modulation, frequency conversion, amplification, and the like to the output signal of adder 120, and performs radio transmission from the antenna 102 through the antenna duplexer 104.

Figure 2:
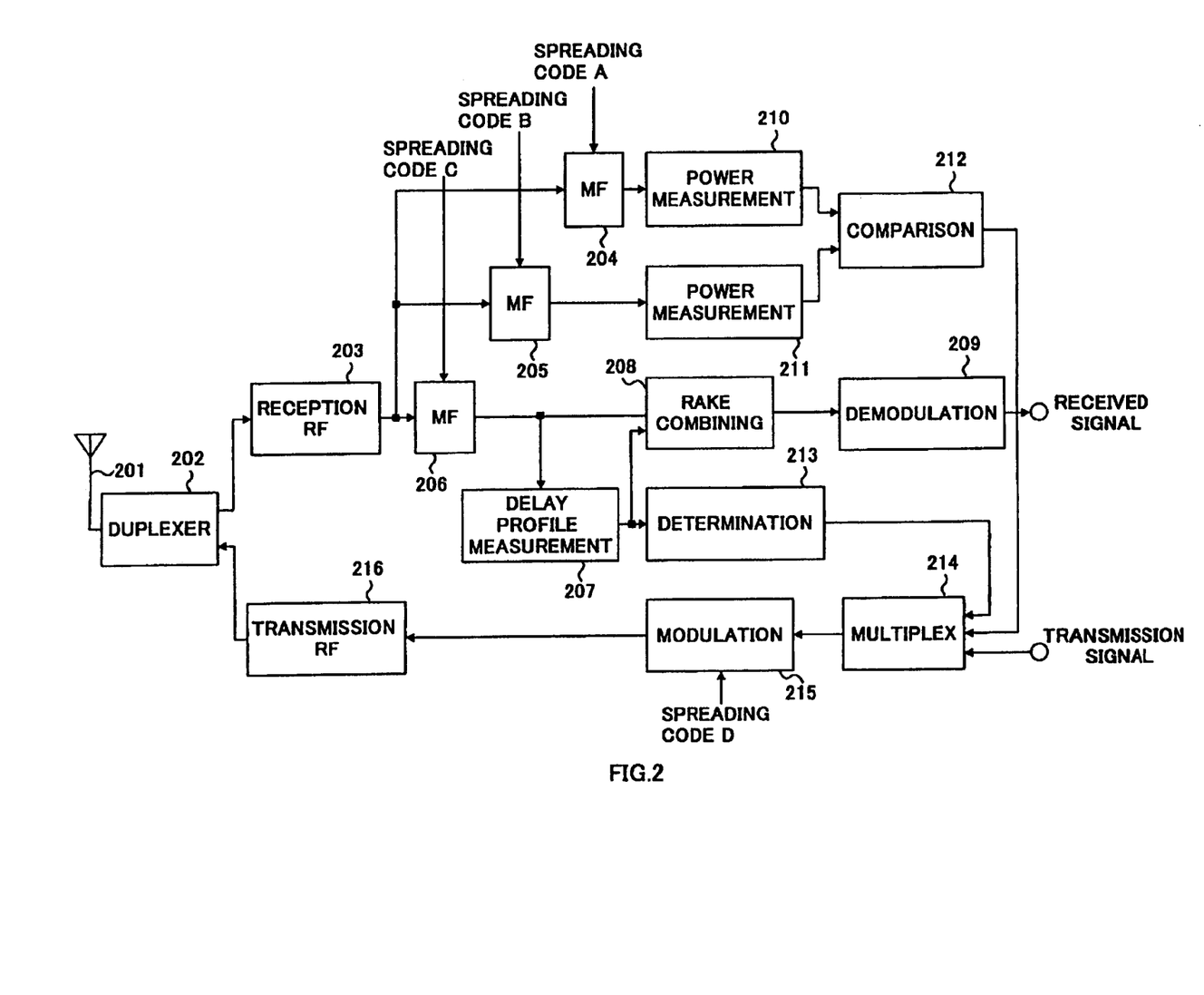
FIG. 2 is a block diagram showing a configuration of a terminal apparatus according to Embodiment 1.

FIG. 2 is a block diagram showing the configuration of the terminal apparatus according to Embodiment 1.

In the terminal apparatus of FIG. 2, an antenna duplexer 202 is used such that the same antenna is employed in both transmission and reception. The antenna duplexer 202 outputs a signal radio received by an antenna 201 to a reception RF section 203, and outputs a transmission signal output from a transmission RF section 216 to the antenna 201. The reception RF section 203 amplifies a received signal input from the antenna duplexer 202, frequency converts the amplified signal to intermediate or baseband frequency, and outputs the frequency-converted signal to matched filters 204, 205, and 206.

The matched filter 204 performs despreading by multiplying the output signal of reception RF section 203 by spreading code A, and outputs the resultant to a power measuring circuit 210.

Similarly, the matched filter 205 performs despreading by multiplying the output signal of reception RF section 203 by spreading code B, and outputs the resultant to a power measuring circuit 211.

The matched filter 206 performs despreading by multiplying the output signal of reception RF section 203 by spreading code C, and outputs the resultant to a delay profile measuring circuit 207 and a RAKE combining circuit 208.

The delay profile measuring circuit 207 measures a delay profile of an output signal of the matched filter 206 to obtain arrival time of the respective paths and power at each arrival time, and outputs time information of reception path to a RAKE combining circuit 208 and a determining circuit 213. In the case of transmitting data in a burst manner, profile measurement is performed with respect to the control signal. In this case, the profile measurement is performed based on the output of the matched filter 204 or 205.

The RAKE combining circuit 208 synchronizes time of the respective signals, each having a different arrival time output from the matched filter 206, based on time information of reception path output from the delay profile measuring circuit 207, and combines these signals. A demodulating circuit 209 demodulates the output signal of RAKE combining circuit 208 to extract received data.

A power measuring circuit 210 measures an output power of the matched filter 204, and outputs the measurement result to a comparison circuit 212.

Similarly, a power measuring circuit 211 measures an output power of the matched filter 205, and outputs the measurement result to the comparison circuit 212. The comparison circuit 212 compares power measured by the power measuring circuit 210 with power measured by the power measuring circuit 211, generates an antenna selective signal, which shows larger spreading code, that is, an antenna number of the base station apparatus, and outputs the resultant to a multiplexing circuit 214.

The determining circuit 213 measures the number of paths from time information of reception path, generates a change necessary/unnecessary signal, which shows whether or not an operation for changing an antenna is needed, that is, reception quality is improved by changing the antenna, and outputs the resultant to the multiplexing circuit 214.

The multiplexing circuit 214 multiplexes the change necessary/unnecessary signal output from the determining circuit 213 and the antenna selective signal output from the comparison circuit 212 into transmission data in a frame format, and outputs the resultant to the modulating circuit 215. The modulating circuit 215 provides primary modulation such as PSK and secondary modulation, which multiplies the output signal of multiplexing circuit 214 by spreading code D, to the output signal of the multiplexing circuit 214, and outputs the resultant to a transmission RF section 216. The transmission RF section 216 provides processing such as quardrature modulation, frequency conversion, amplification, and the like to the output signal of the modulating circuit 215, and performs radio transmission from the antenna 201 through the antenna duplexer 202.

Figure 3:
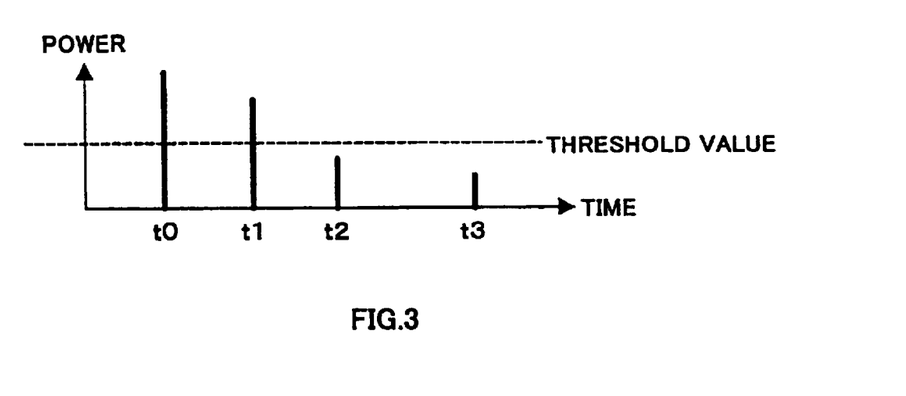
FIG. 3 is a view explaining a delay profile according to Embodiment 1.

Next, a specific explanation is given of delay profile measurement processing in the delay profile measuring circuits 109, 110 of FIG. 1 and the delay profile measuring circuit 207 of FIG. 2 with reference to a drawing illustrating an example of delay profile of FIG. 3. In FIG. 3, a horizontal axis denotes time and a vertical axis denotes power.

In radio communications, there is a delay wave in which the transmitted signal arrives at the receiving side after being reflected on a mountain, a building, and the like in addition to a direct wave in which the transmitted signal directly arrives at the receiving side. FIG. 3 shows that a direct wave signal of power p0 arrives at time t0, and delay wave signals of p1, p2, p3 arrive at time t1, t2, t3, respectively.

The delay profile measuring circuits 109 and 110 and the delay profile measuring circuit 207 measure the delay profile as shown in FIG. 3 so as to obtain the number of paths, in which power is higher than a preset threshold value, and arrival time of each path. In the case of FIG. 3, since power of received signal at time to and time t1 is higher than the threshold value, the number of paths is set to 2.

Figure 4:
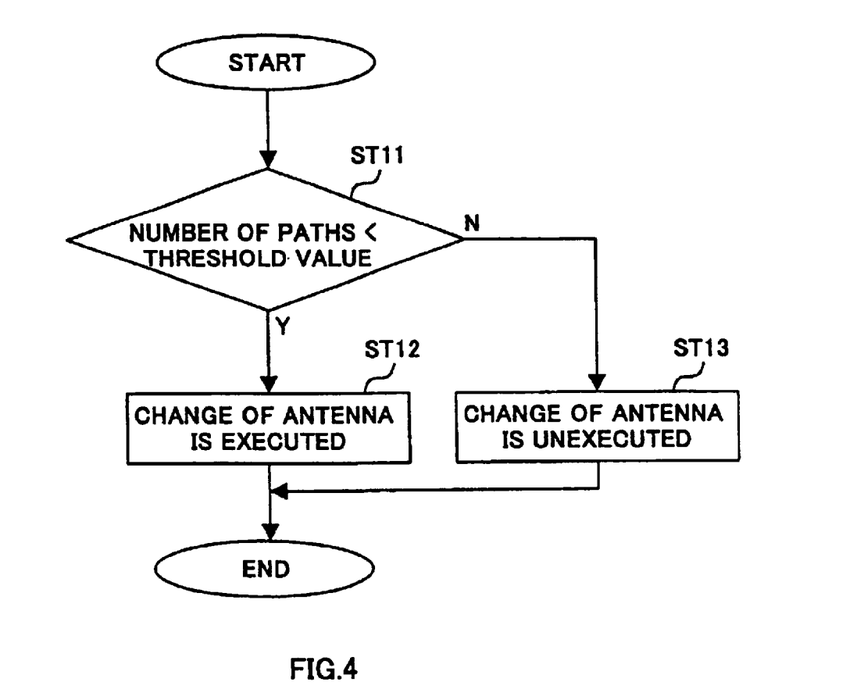
FIG. 4 is a flowchart showing processing of a determining circuit according to Embodiment 1.

Next, an explanation is given of determination processing of determining circuit 213 of Example 1 with reference to the flowchart of FIG. 4.

First, the determining circuit 213 determines whether or not the number of paths input from the delay profile measuring circuit 207 is smaller than the preset threshold value (ST11). If the number of paths is smaller than the preset threshold value, the determining circuit 213 generates the change necessary/unnecessary signal having information to the effect that the operation for changing an antenna is necessary (ST12). Moreover, if the number of paths is larger or equal than/to the preset threshold value, the determining circuit 213 generates the change necessary/unnecessary signal having information to the effect that the operation for changing antenna is unnecessary (ST13).

For example, in a case where the preset threshold value is "3" and the delay profile shown in FIG. 3 is measured by the delay profile measuring circuit 207 the number of paths to be input to the determining circuit 213 is "2", which is smaller than the threshold value "3." Therefore, the determining circuit 213 generates the change necessary/unnecessary signal having information to the effect that the operation for changing an antenna is necessary, and outputs it to the multiplexing circuit 214.

Next, an explanation will be given of the flow of the signal of the reverse link in the radio communication system of Embodiment 1.

The multiplexing circuit 214 multiplexes the change necessary/unnecessary signal and the antenna selective signal into transmission data from the terminal apparatus in the frame format, and the modulating circuit 215 provides primary modulation such as PSK and secondary modulation, which multiplies the output signal of multiplexing circuit 214 by spreading code D, to the output signal of the multiplexing circuit 214. The transmission RF section 216 provides processing such as quardrature modulation, frequency conversion, amplification, and the like to the output signal of the modulating circuit 215, and performs radio transmission from the antenna 201 through the antenna duplexer 202.

The signals radio transmitted from the antenna 201 of the terminal apparatus are, received by the antennas 101 and 102 of the base station apparatus.

The signal received by the antenna 101 is input to the reception RF circuit 105 through the antenna duplexer 103, and the input signal is amplified and frequency converted to intermediate or baseband frequency by the reception RF circuit 105. The output signal of reception RF circuit 105 is despread by the matched filter 107 using despreading code D, and the despread signal is output to the delay profile measuring circuit 109 and RAKE combining circuit 111. The delay profile measuring circuit 109 measures the profile of the output signal of matched filter 107 to obtain arrival time of each reception path and power at each arrival time, and outputs time information of reception path to the RAKE combining circuit 111.

Similarly, the signal received by the antenna 102 is input to the reception RF circuit 106 through the antenna duplexer 104, and the input signal is amplified and frequency converted to intermediate or baseband frequency by the reception RF circuit 106. The output signal of reception RF circuit 106 is despread by the matched filter 108 using despreading code D, and the despread signal is output to the delay profile measuring circuit 110 and RAKE combining circuit 111. The delay profile measuring circuit 110 measures the profile of the output signal of matched filter 108 to obtain arrival time of each reception path and power at each arrival time, and outputs time information of reception path to the RAKE combining circuit 111.

The RAKE combing circuit 111 combines the respective signals each having a different arrival time, and the demodulating circuit 112 demodulates the combined signals, and the separating circuit 113 separates the change necessary/unnecessary signal and the antenna selective signal so as to extract received data.

The separated necessary/unnecessary signal and the antenna selective signal are output to the antenna change controlling circuit 114. The antenna change controlling circuit 114 determines whether or not the change of antenna is executed based on the necessary/unnecessary signal. Then, if the change of antenna is executed, the selector 118 is changed based on the antenna selective signal.

Next, an explanation will be given of the signal flow of the forward link in the radio communication system of Embodiment 1.

Control signal A transmitted from the base station apparatus is subjected to primary processing such as PSK by the modulating circuit 115. Moreover, secondary modulation processing of spread processing using spreading code A is provided thereto, and the resultant is output to the adder 119. Similarly, control signal B transmitted from the base station apparatus is subjected to primary processing such as PSK by the modulating circuit 116. Moreover, secondary modulation processing of spread processing using spreading code B is provided thereto, and the resultant is output to the adder 119.

Transmission data of the forward link transmitted from the base station apparatus is subjected to primary processing such as PSK by the modulating circuit 117. Moreover, secondary modulation processing of spread processing using spreading code C is provided thereto, and the resultant is output to the adder 119 or 120 through the selector 118, and control signals A and B are multiplexed.

The transmission RF section 121 provides processing such as quardrature modulation, frequency conversion, amplification, and the like to the output signal of adder 119, and performs radio transmission from the antenna 101 through the antenna duplexer 103. The transmission RF section 122 provides processing such as quardrature modulation, frequency conversion, amplification, and the like to the output signal of adder 120, and performs radio transmission from the antenna 102 through the antenna duplexer 104.

The signals radio transmitted from the antennas 101 and 102 of the base station apparatus are received by the antenna 201 of the terminal apparatus.

The signal received by the antenna 201 is input to the reception RF circuit 203 via the antenna duplexer 202. The input signal is amplified, and frequency converted to intermediate frequency or baseband frequency, and the frequency converted signal is input to the matched filters 204, 205, and 206.

The matched filter 206 provides despread processing to the signal input thereto using spreading code C, and outputs the resultant to the delay profile measuring circuit 207 and RAKE combining circuit 208.

The delay profile measuring circuit 207 measures the delay profile of the output signal of matched filter 206 to obtain arrival time of each reception path and power at each arrival time, and outputs time information of the reception path to the RAKE combining circuit 208 and determining circuit 213.

The RAKE combining circuit 208 combines the respective signals each having a different arrival time, and the demodulating circuit 209 demodulates the combined signals to extract received data.

The determining circuit 213 measures the number of paths from time information of the reception path and generates the change necessary/unnecessary signal based on the measured number of paths, and outputs the resultant to the multiplexing circuit 214.

The matched filter 204 provides despread processing to the signal input thereto using spreading code A. Then, the power measuring circuit 210 measures power, and the result of measurement is output to the comparison circuit 212. Similarly, the matched filter 205 provides despread processing to the signal input thereto using spreading code B. Then, the power measuring circuit 211 measures power, and the result of measurement is output to the comparison circuit 212. The comparison circuit 212 compares power measured by the power measuring circuit 210 with power measured by the power measuring circuit 211, generates the antenna selective signal, which shows larger spreading code, that is, the antenna number of the base station apparatus, and outputs the resultant to the multiplexing circuit 214.

Thus, in the case where the number of paths is small, the propagation path is selected to execute the change of antenna, and this makes it possible to improve reception quality. While, in the case where the number of paths is large, path diversity effect, which is caused by RAKE combining, can be obtained. As a result, control is performed to prevent the antenna from being changed, and this makes it possible to prevent a sudden change in interference power to the other terminal apparatus from being caused by the change of antenna, and to suppress deterioration in reception quality of the other terminal apparatus.

Embodiment 2

Figure 5:
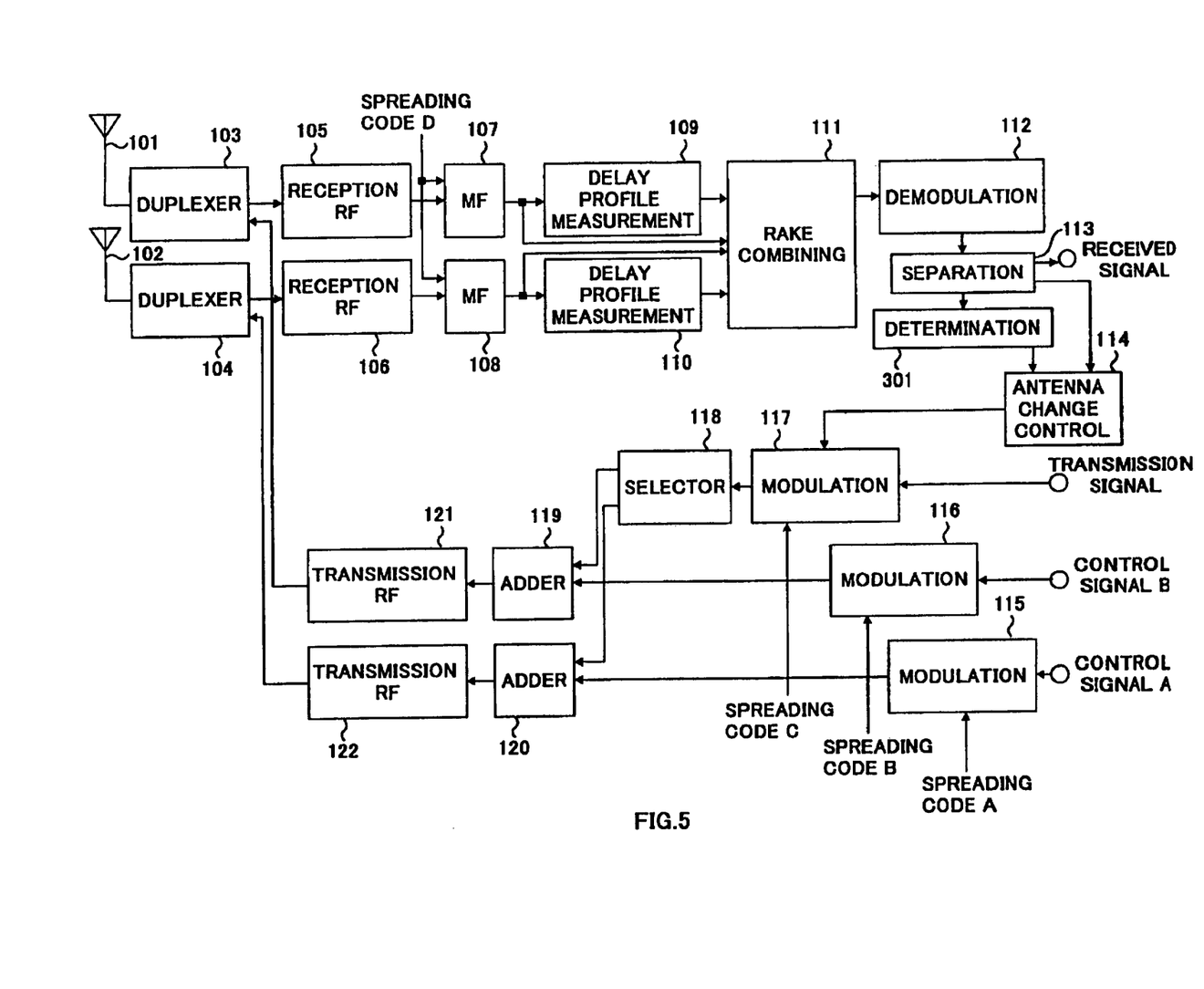
FIG. 5 is a block diagram showing a configuration of a base station apparatus according to Embodiment 2 of the present invention.

Embodiment 2 is a specific form wherein the terminal apparatus measures the number of reception paths from the received signal, transmits information, which shows the number of paths, to a base station, and the base station determines whether or not the change of antenna is needed based on the number of paths received from the terminal apparatus, and selects whether or not the change of antenna is executed based on the determination result FIG. 5 is a block diagram showing the configuration of the base station apparatus according to Embodiment 2 of the present invention. The base station apparatus of FIG. 5 adopts the configuration in which a determining circuit 301 is added to the base station apparatus of FIG. 1. In the base station apparatus of FIG. 5, the same reference numerals as those of FIG. 1 are added to the configuration portions, which are common to the base station apparatus of FIG. 1 in connection with the operation, and the explanation is omitted.

The separating circuit 113 separates the control signal from the output signal of demodulating circuit 112 to extract received data, picks up time information of reception path and the antenna selective signal from the control signal, outputs time information of reception path to the determining circuit 301, and outputs the antenna selective signal to the antenna change controlling circuit 114.

The determining circuit 301 measures the number of paths from time information of reception path output from the separating circuit 113, generates the necessary/unnecessary signal based on the number of paths, and outputs the resultant to the antenna change controlling circuit 114.

The antenna change controlling circuit 114 reads the change necessary/unnecessary signal output from the determining circuit 301. Then, in a case where the operation for changing the antenna is necessary, the antenna change controlling section 114 performs the change of a selector 118 to transmit the signal from the antenna, which is shown by the antenna selective signal output from the separating circuit 113.

Figure 6:
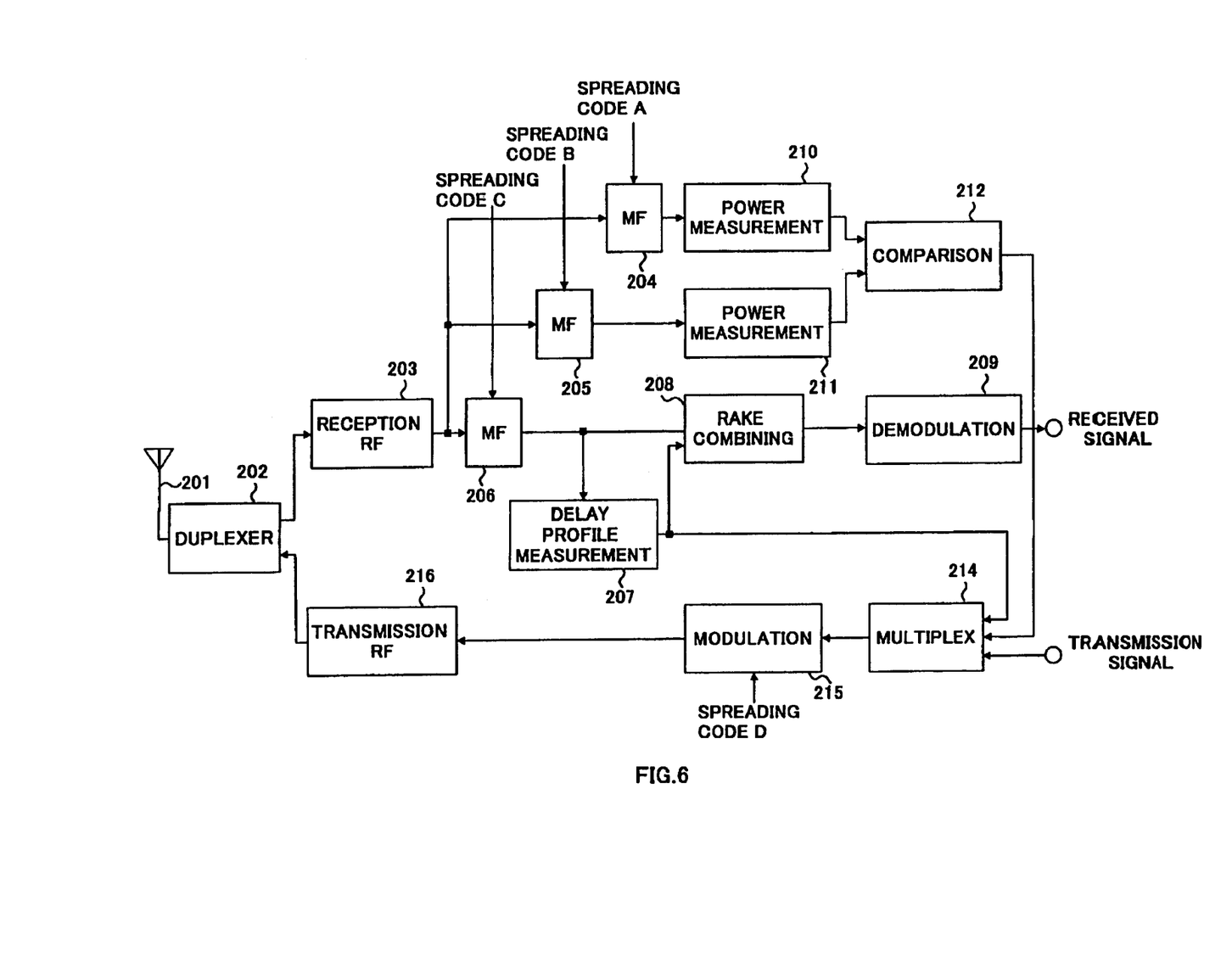
FIG. 6 is a block diagram showing a configuration of a terminal apparatus according to Embodiment 2.

FIG. 6 is a block diagram showing the configuration of the terminal apparatus according to Embodiment 2 of the present invention. The terminal apparatus of FIG. 6 adopts the configuration in which the determining circuit 213 is deleted from the terminal apparatus of FIG. 2. In the base station apparatus of FIG. 6, the same reference numerals as those of FIG. 2 are added to the configuration portions, which are common to the base station apparatus of FIG. 2 in connection with the operation, and the explanation is omitted.

The delay profile measuring circuit 207 measures the delay profile of the output signal of matched filter 206 so as to obtain arrival time of each path and power at each arrival time. Then, the delay profile measuring circuit 207 outputs time information of reception path to the RAKE combining circuit 208 and multiplexing circuit 214.

The multiplexing circuit 214 multiplexes time information of reception path, which has been output from the delay profile measuring circuit 207, and the antenna selective signal, which has been output from the comparison circuit 212, into transmission data in the frame format, and outputs the resultant to the demodulating circuit 215.

Thus, the base station apparatus determines whether or not the change of antenna is executed based on the number of reception paths measured by the terminal apparatus. This makes it possible to reduce the scale of hardware of the terminal apparatus or that of software, and to improve miniaturization of the terminal apparatus and a decrease in power consumption.

Embodiment 3

Embodiment 3 focuses on the point that the delay profile of the terminal apparatus and that of the base station apparatus are substantially the same as each other. More specifically, Embodiment 3 is a specific form wherein the base station apparatus measures the number of reception paths from the received signal, determines whether or not the change of antenna is needed based on the measured number of paths, and selects whether or not the change of antenna is executed based on the determination result.

Figure 7:
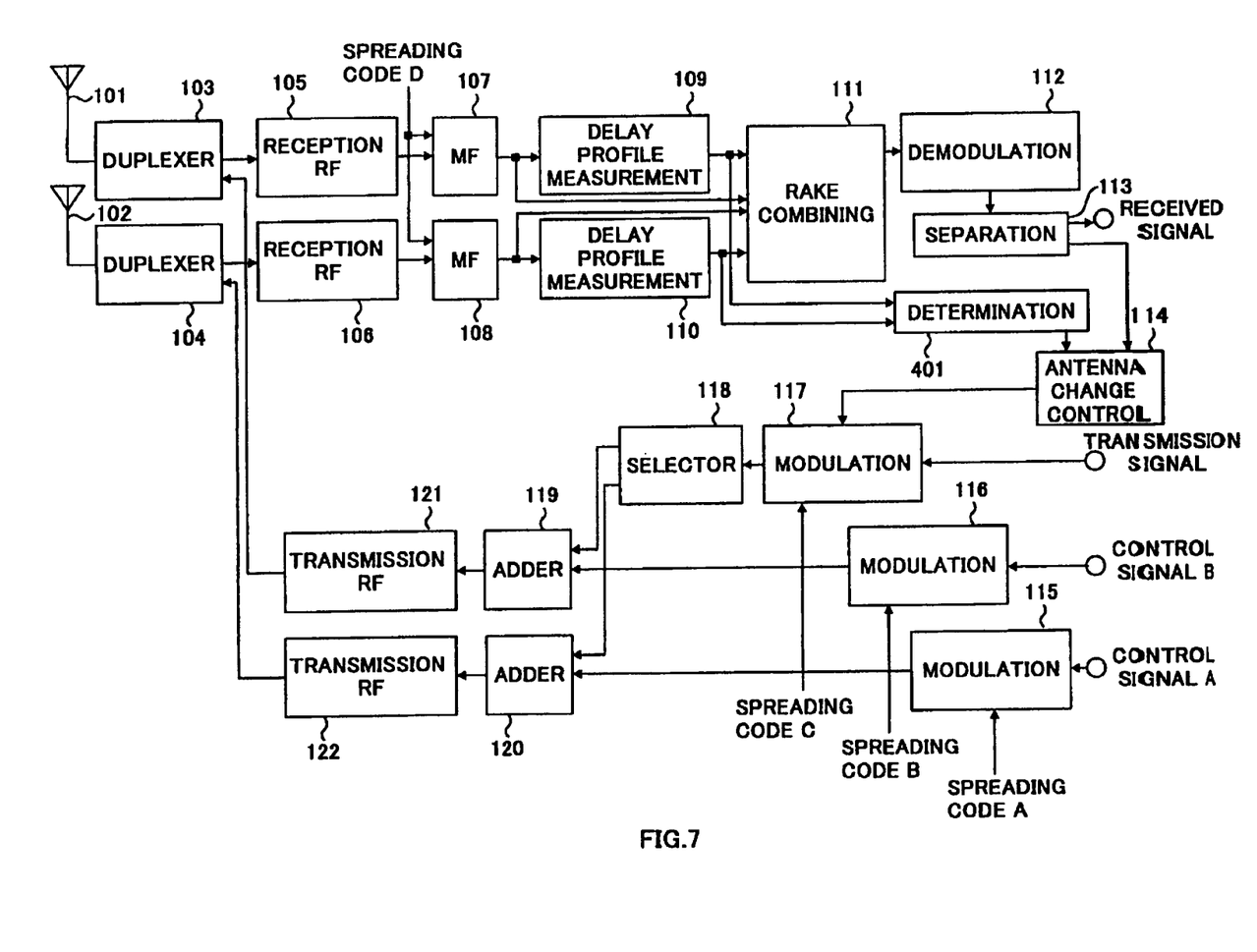
FIG. 7 is a block diagram showing a configuration of a base station apparatus according to Embodiment 3 of the present invention.

FIG. 7 is a block diagram showing the configuration of the base station apparatus according to Embodiment 3 of the present invention.

The base station apparatus of FIG. 7 adopts the configuration in which the determining circuit 401 is added to the base station apparatus of FIG. 1.

In the base station apparatus of FIG. 7, the same reference numerals as those of FIG. 1 are added to the configuration portions, which are common to the base station apparatus of FIG. 1 in connection with the operation, and the explanation is omitted.

The delay profile measuring circuits 109 and measure the delay profiles of the output signals of matched filters 107 and 108, respectively, so as to obtain the arrival time of the signal of each path and power at each arrival time, and output time information of reception path to RAKE combining circuit 111 and determining circuit 401, respectively.

The determining circuit 401 measures the number of paths from time information of reception path, which has been output from the delay profile measuring circuits 109 and 110, generates the change necessary/unnecessary signal based on the measured number of paths, and outputs the resultant to the antenna change controlling circuit 114.

The antenna change controlling circuit 114 reads the necessary/unnecessary signal output from the determining circuit 401. Then, if the operation for changing the antenna is needed, the antenna change controlling circuit 114 performs the change of selector 118 to transmit the signal from the antenna, which is shown by the antenna selective signal output from the separating circuit 113.

Figure 8:
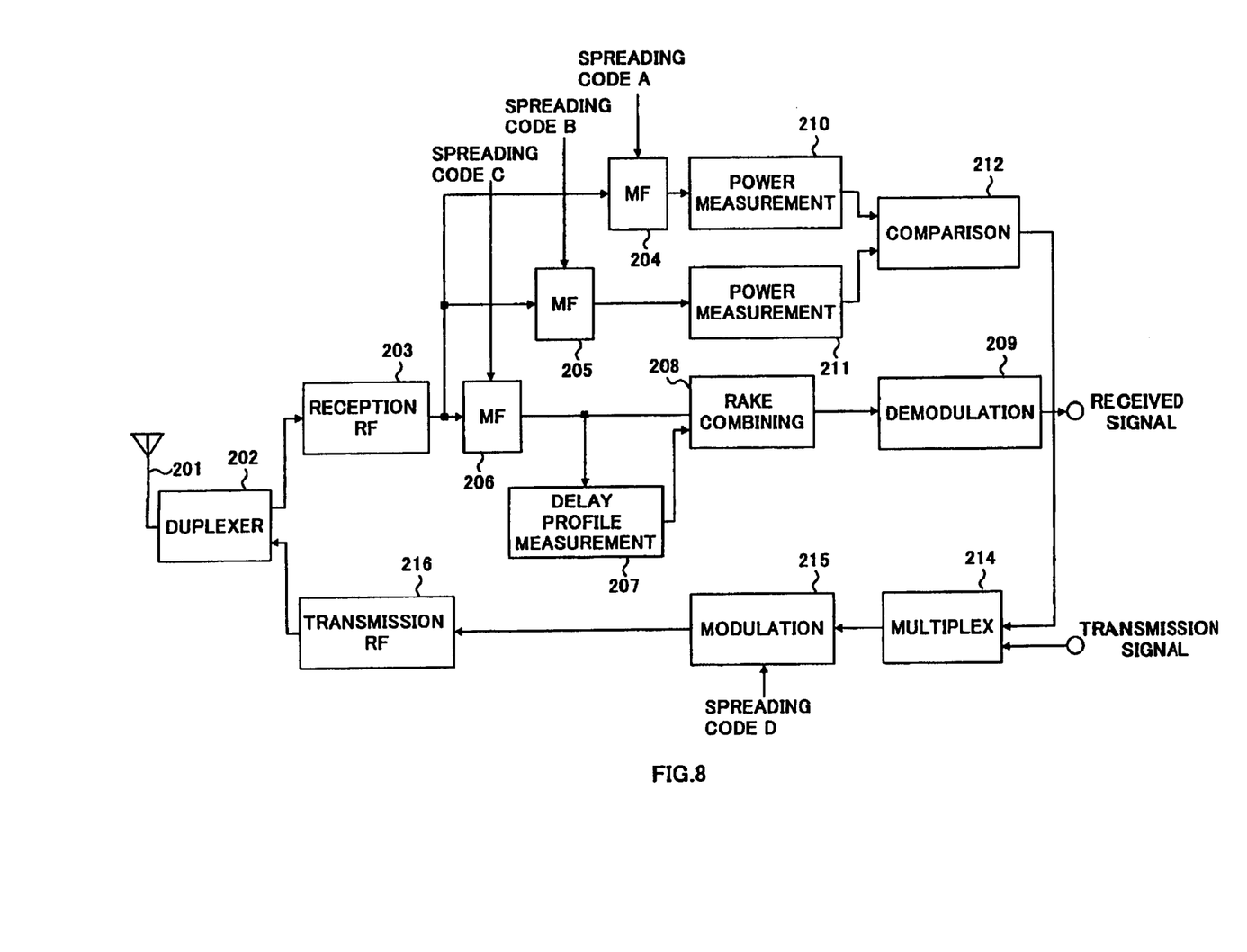
FIG. 8 is a block diagram showing a configuration of a terminal apparatus according to Embodiment 3.

FIG. 8 is a block diagram showing the configuration of the terminal apparatus according to Embodiment 3 of the present invention. The terminal apparatus of FIG. 8 adopts the configuration in which the determining circuit 213 is deleted from the terminal apparatus of FIG. 2.

In the base station apparatus of FIG. 8, the same reference numerals as those of FIG. 2 are added to the configuration portions, which are common to the base station apparatus of FIG. 2 in connection with the operation, and the explanation is omitted.

The delay profile measuring circuit 207 measures the delay profile of the output signal of matched filter 206 so as to obtain arrival time of each path and power at each arrival time, and outputs time information of reception path to the RAKE combining circuit 208.

The multiplexing circuit 214 multiplexes the antenna selective signal, which has been output from the comparison circuit 212, into transmission data in the frame format, and outputs the resultant to the modulating circuit 215.

Thus, attention is paid on the point that the delay profile of the terminal apparatus and that of the base station apparatus are substantially the same as each other. Then, the base station apparatus measures the number of reception paths and determines whether or not the change of antenna is executed. This makes it possible to reduce the scale of hardware of the terminal apparatus or that of software, and to improve miniaturization of the terminal apparatus and a decrease in power consumption.

Embodiment 4

Embodiment 4 focuses on the point that effect of transmission diversity is small since the length of time at which the received signal continuously drops is short when the Doppler frequency is high. More specifically, Embodiment 4 is a specific form wherein the terminal apparatus measures the number of reception paths and the Doppler frequency from the received signal and transmits information, which shows the number of paths and the Doppler frequency, to the base station apparatus, and the base station apparatus determines whether or not the change of antenna is needed based on the number of paths and the Doppler frequency received from the terminal apparatus, and selects whether or not the change of antenna is executed based on the determination result.

Figure 9:
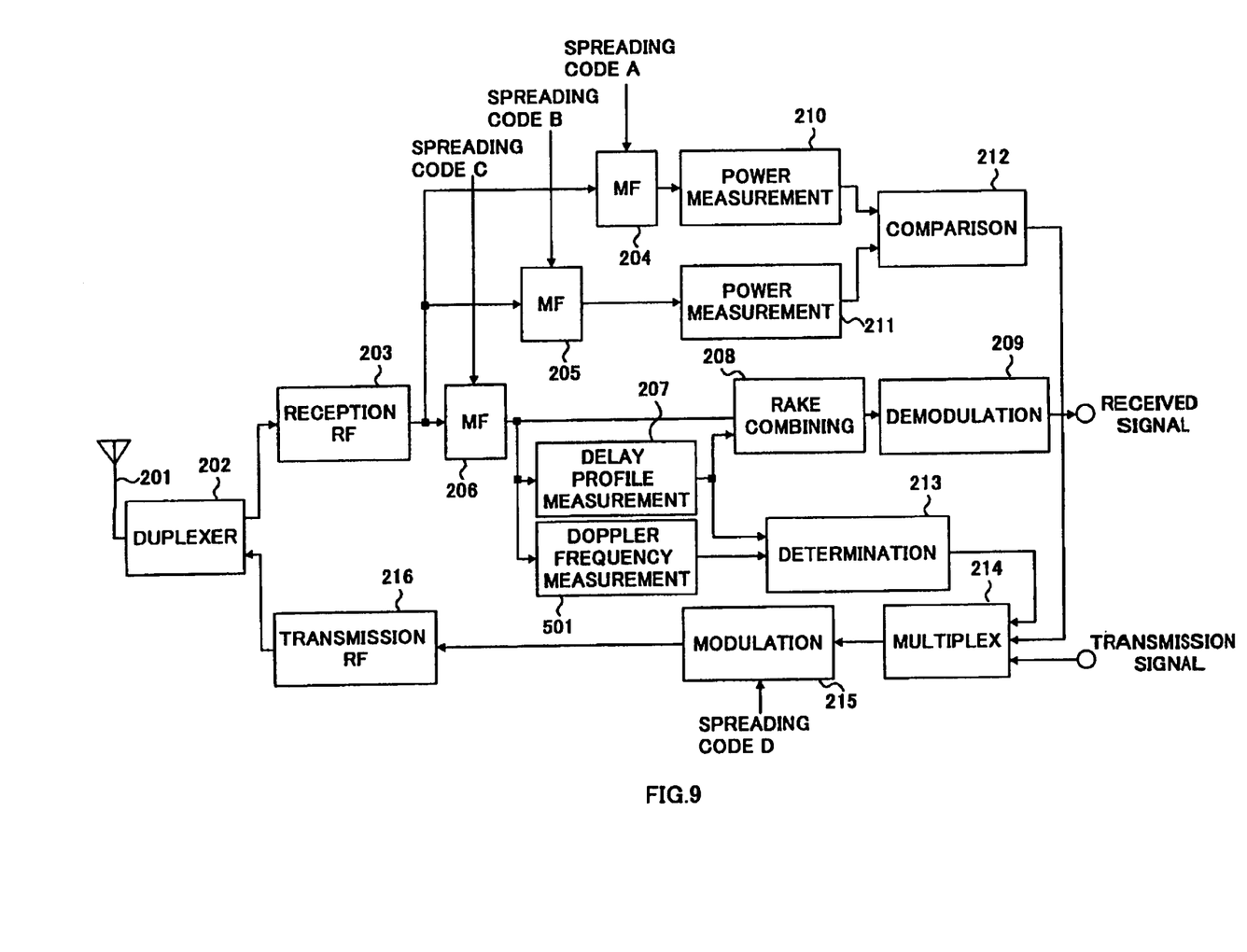
FIG. 9 is a block diagram showing a configuration of a terminal apparatus according to Embodiment 4.

FIG. 9 is a block diagram showing the configuration of the terminal apparatus according to Embodiment 4 of the present invention. The terminal apparatus of FIG. 9 adopts the configuration in which a Doppler frequency measuring circuit 501 is added to the terminal apparatus of FIG. 2. In the base station apparatus of FIG. 9, the same reference numerals as those of FIG. 2 are added to the configuration portions, which are common to the base station apparatus of FIG. 2 in connection with the operation, and the explanation is omitted.

The matched filter 206 performs despreading by multiplying the output signal of reception RF section 203 by spreading code C, and outputs the resultant to the delay profile measuring circuit 207, RAKE combining circuit 208, and Doppler frequency measuring circuit 501.

The Doppler frequency measuring circuit 501 measures the Doppler frequency of the output signal of matched filter 206, and outputs the result of measurement to the determining circuit 213. It should be noted that the measuring method of Doppler frequency is already proposed in the Document "Basics of Mobile Communications" (Issued on Oct. 1, 1986, the Institute of Electronics, Information and Communication Engineers) and the like.

The determining circuit 213 measures the number of paths from time information of reception path, which has been output from the delay profile measuring circuit 207, generates the change necessary/unnecessary signal based on the number of paths and the Doppler frequency measured by the Doppler frequency measuring circuit 501, and outputs the resultant to the multiplexing circuit 214.

Figure 10:
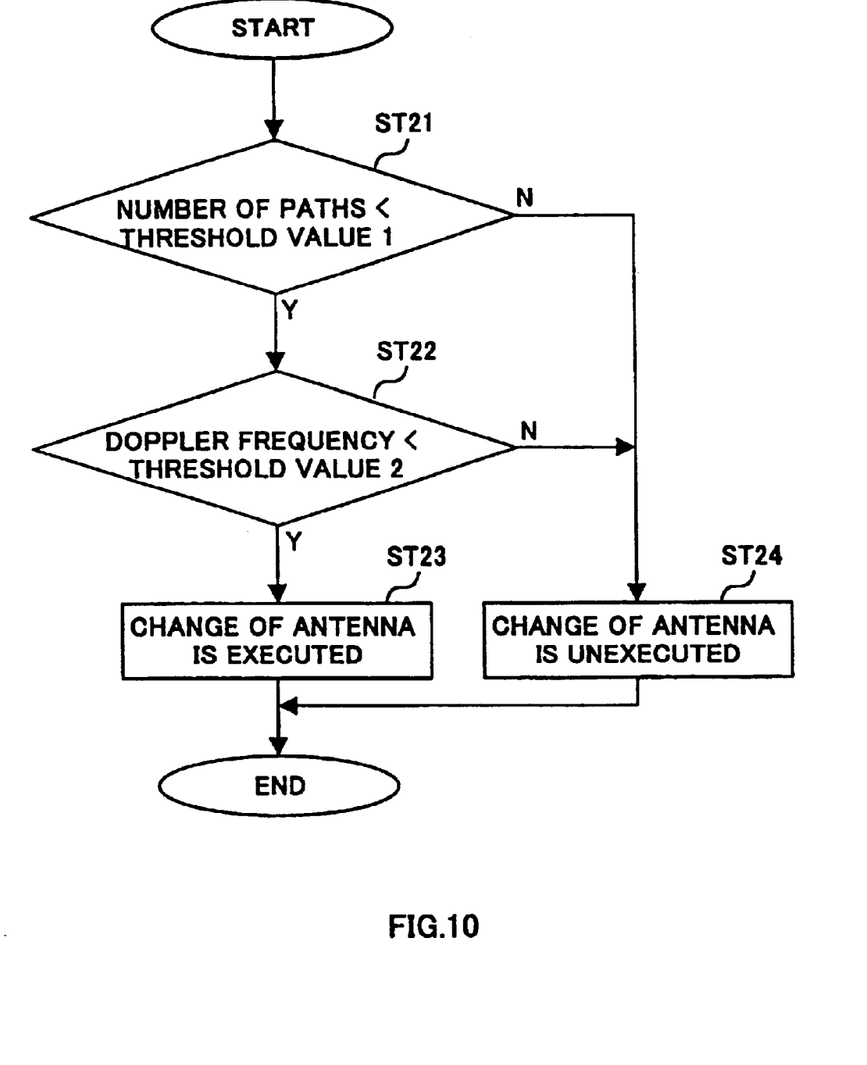
FIG. 10 is a flowchart showing processing of a determining circuit according to Embodiment 4.

The following will give an explanation of the determination processing of determining circuit 213 of Embodiment 1 with reference to the flowchart of FIG. 10.

First, the determining circuit 213 determines whether or not the number of paths input from the delay profile measuring circuit 207 is smaller than the preset threshold value 1 (ST21). If the number of paths is smaller than the threshold value 1, the determining circuit 213 determines whether or not the Doppler frequency input from the Doppler frequency measuring circuit 501 is smaller than the preset threshold value 2 (ST22). If the Doppler frequency is smaller than the preset threshold value 2, the determining circuit 213 generates the change necessary/unnecessary signal to the effect that the operation for changing the antenna is necessary (ST23).

If the number of paths is larger or equal than/to the threshold value 1 and the Doppler frequency is larger or equal than/to the preset threshold value 2, the determining circuit 213 generates the change necessary/unnecessary signal to the effect that the operation for changing the antenna is unnecessary (ST24).

Thus, in the case where the number of paths is small and frequency offset is small, the propagation path is selected to execute the change of antenna, and this makes it possible to improve reception quality. While, in the case where the number of paths is large or frequency offset is large, path diversity effect, which is caused by RAKE combining, can be obtained. As a result, control is performed to prevent the antenna from being changed, and this makes it possible to prevent a sudden change in interference power to the other terminal apparatus from being caused by the change of antenna, and to suppress deterioration in reception quality of the other terminal apparatus.

The configuration and operation of the base station apparatus of Embodiment 4 are the same as those of FIG. 1, and the explanation is omitted.

Moreover, Embodiment 4 can be combined with Embodiment 2 or Embodiment 3. Namely, the following combinations can be executed. Specifically, the terminal apparatus measures the number of paths and the Doppler frequency, and the base station apparatus determines whether or not the change of antenna is needed. The base station apparatus measures the number of paths and the Doppler frequency, and determines whether or not the change of antenna is needed. The terminal apparatus measures the number of paths, and the base station apparatus measures the Doppler frequency and determines whether or not the change of antenna is needed. The terminal apparatus measures the Doppler frequency, and the base station apparatus measures the number of paths and determines whether or not the change of antenna is needed.

As explained above, according to the radio communication apparatus and the radio communication method of the present invention, the change of antenna can be performed at the time, serving as a starting point, when reception quality becomes worse. Moreover, in a case where effect of improving reception performance, which is caused by the change of antenna, is small, the operation for changing the antenna is stopped so that the change in an amount of interference to the other terminal apparatus can be eliminated.

This application is based on the Japanese Patent Application No. HEI 10-328293 filed on Nov. 18, 1998, entire content of which is expressly incorporated by reference herein.

What is claimed is:

1. A radio communication apparatus comprising:
    path measuring means for measuring the number of paths of a forward link;
    determining means for determining whether or not an operation for changing an antenna is needed based on the number of paths; and
    multiplexing means for multiplexing a control signal with a determination result of said determining means into transmission data.

2. The radio communication apparatus according to claim 1, wherein said determining means determines that execution of the operation for changing the antenna is needed when the number of paths of the forward link is smaller than a threshold value.

3. The radio communication apparatus according to claim 1, further comprising Doppler frequency measuring means for measuring a Doppler frequency of a received signal, wherein said determining means determines whether or not the operation for changing the antenna is needed based on the number of paths of the forward link and the Doppler frequency.

4. The radio communication apparatus according to claim 3, wherein said determining means determines that execution of the operation for changing the antenna is needed when the number of paths of the forward link is smaller than a first threshold value and the Doppler frequency is smaller than a predetermined second threshold value.

5. A radio communication apparatus comprising:
    change controlling means for determining whether or not an operation for changing a transmission antenna is executed based on said control signal contained in a signal transmitted from the radio communication apparatus according to claim 1.

6. A communication terminal apparatus, having a radio communication apparatus thereon, said radio communication apparatus comprising:
    path measuring means for measuring the number of paths of a forward link;
    determining means for determining whether or not an operation for changing an antenna is needed based on the number of paths; and
    multiplexing means for multiplexing a control signal with a determination result of said determining means into transmission data.

7. A base station apparatus, having a radio communication apparatus thereon, said radio communication apparatus comprising:
    change controlling means for determining whether or not an operation for changing a transmission antenna is executed based on said control signal contained in a signal transmitted from the radio communication apparatus according to claim 6.

8. A radio communication apparatus comprising:
    determining means for determining whether or not an operation for changing an antenna is executed based on the number of paths of a forward link; and
    change controlling means for determining whether or not an operation for changing a transmission antenna is executed based on the determination result of said second determining means.

9. A radio communication apparatus comprising:
    path measuring means for measuring the number of paths of a forward link; and
    multiplexing means for multiplexing a control signal with information indicating the number of paths of the forward link into transmission data to the radio communication apparatus according to claim 8.

10. The radio communication apparatus according to claim 8, wherein said determining means determines that execution of the operation for changing the antenna is needed when the number of paths of the forward link is smaller than a predetermined threshold value.

11. A radio communication apparatus comprising:

determining means for determining whether or not an operation for changing an antenna is executed based on the number of paths of a forward link and a Doppler frequency; and change controlling means for determining whether or not an operation for changing a transmission antenna is executed based on the determination result of said determining means.

12. A radio communication apparatus comprising:

path measuring means for measuring the number of paths of a forward link;

Doppler frequency measuring means for measuring a Doppler frequency of a received signal; and multiplexing means for multiplexing a control signal with information indicating the number of paths of the forward link and information indicating the Doppler frequency into transmission data to the radio communication apparatus according to claim 11.

13. The radio communication apparatus according to claim 11, wherein said determining means determines that execution of the operation for changing the antenna is needed when the number of paths of the forward link is smaller than a predetermined first threshold value and the Doppler frequency is smaller than a predetermined second threshold value.

14. A radio communication apparatus comprising:

path number measuring means for measuring the number of paths of a reverse link;

determining means for determining whether or not an operation for changing an antenna is needed based on the number of paths of the reverse link; and change controlling means for determining whether or not an operation for changing a transmission antenna is executed based on the determination result of said determining means.

15. The radio communication apparatus according to claim 14, wherein said determining means determines that execution of the operation for changing the antenna is needed when the number of paths of the reverse link is smaller than a predetermined threshold value.

16. The radio communication apparatus according to claim 14, further comprising second Doppler frequency measuring means for measuring a Doppler frequency of a received signal, wherein said determining means determines whether or not the operation for chancing the antenna is needed based on the number of paths of the reverse link and the Doppler frequency.

17. The radio communication apparatus according to claim 14, wherein said determining means determines that the operation for chancing the antenna is needed when the number of paths of the reverse link is smaller than a predetermined first threshold value and the Doppler frequency is smaller than a predetermined second threshold value.

18. A transmission antenna changing method comprising:

(a) measuring the number of paths of a link;

(b) determining whether or not an operation for changing an antenna is needed based on the measured number of paths; and (c) determining whether or not an operation for changing a transmission antenna of forward transmission data is executed based on the determination result of step (b).

19. The transmission antenna changing method according to claim 18, wherein it is determined in step (b) that execution of the operation for changing the antenna is needed when the number of paths of the link is smaller than a predetermined threshold value.

20. The transmission antenna changing method according to claim 18, further comprising measuring a Doppler frequency of a received signal, wherein in step (b), whether or not the operation for changing the antenna is needed is determined based on the number of paths of the link and the Doppler frequency.

21. The transmission antenna changing method according to claim 20, wherein it is determined in step (b) that execution of the operation for changing the antenna is needed when the number of paths of the link is smaller than a first predetermined threshold value and the Doppler frequency is smaller than a second predetermined threshold value.

* * * * *